UNITED STATES PATENT OFFICE.

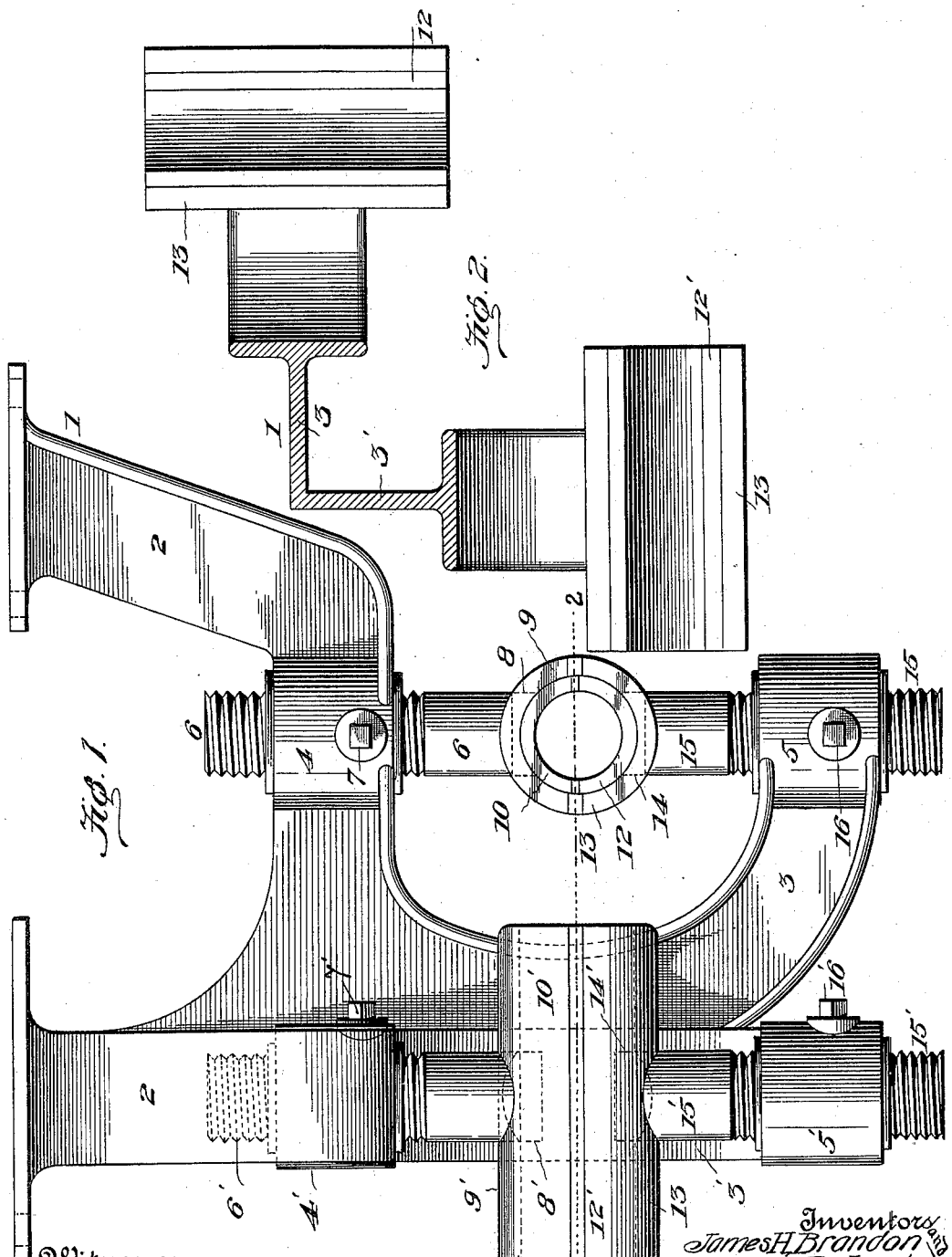

FREEMAN BEBOUT AND JAMES H. BRANDON, OF EAST LIVERPOOL, OHIO, ASSIGNORS OF ONE-THIRD TO JAMES C. DEIDRICK, OF SAME PLACE.

SHAFT-HANGER.

SPECIFICATION forming part of Letters Patent No. 606,327, dated June 28, 1898.

Application filed January 20, 1898. Serial No. 667,321. (No model.)

*To all whom it may concern:*

Be it known that we, FREEMAN BEBOUT and JAMES H. BRANDON, citizens of the United States, residing at East Liverpool, in the county of Columbiana and State of Ohio, have invented certain new and useful Improvements in Shaft-Hangers; and we do declare the following to be a full, clear, and exact description of the invention, such as will enable others skilled in the art to which it appertains to make and use the same.

Our invention relates to improvements in shaft-hangers, and more particularly to that class of shaft-hangers employed as a bearing for the ends of the angle-shafting usually run by miter or bevel gearing; and the object is to dispense with such gearing by using a mule-stand and belting in connection with our improved hanger.

To this end the invention consists in the construction, combination, and arrangement of the several parts of the device, as will be hereinafter more fully described, and particularly pointed out in the claim.

The accompanying drawings show our invention in the best form now known to us; but many changes in the details might be made within the skill of a good mechanic without departing from the spirit of our invention as set forth in the claim at the end of this specification.

The same reference characters indicate the same parts in the invention.

Figure 1 is a side elevation of our improved angle-shaft hanger. Fig. 2 is a horizontal section on the dotted line 2 2 of Fig. 1.

1 represents the angle-bracket formed with the integral arms 2 3 and 2' 3'. The arms 2 3 are provided with the integral alined and internally-threaded hubs 4 and 5.

6 represents an externally-threaded stud adjustably secured in the hub 4 by means of the set-screw 7, and the lower cylindrical end of said stud extends into a corresponding recess 8 in the semicylindrical cap 9, which also contains the upper half 10 of the babbitt box.

12 denotes the lower half of the babbitt box, and 13 the bearing-box, which is provided with the recess 14 to receive the upper end of the stud 15, the lower threaded end of which is adjustably secured in the internally-threaded hub 5 by means of the set-screw 16.

The arms 2' 3' are also provided with integral alined and internally-threaded hubs 4' 5', and 6' denotes an externally-threaded stud adjustably secured in the hub 4' by means of the set-screw 7', the lower cylindrical end of said stud extending into a corresponding recess 8' in the semicylindrical cap 9', which also receives the upper half 10' of the babbitt box. 12' represents the lower half of said box, and 13 the corresponding portion of the bearing-box, which is formed with the recess 14' to receive the upper end of the stud 15', the lower threaded end of which is adjustably secured in the internally-threaded hub 5' by means of the set-screw 16'. This construction enables the shafts (not shown) to be supported in said bearings at any angle from an obtuse to an acute, and by means of suitable pulleys fixed on said shafts and an endless belt and mule-stand (not shown) a rotary motion may be noiselessly communicated from one shaft to the other.

Of course it will be understood that this hanger may be fixed to the ceiling, post, or post-arm and in any other position where it is necessary to support the meeting ends of two lines of shafting extending in opposite directions.

Having thus fully described our invention, what we claim as new and useful, and desire to secure by Letters Patent of the United States, is—

An angle-shaft hanger, comprising the bracket 1, formed with the integral arms 2, 3, and 2' 3', the latter being arranged at a right angle to the former, the alined, internally-threaded hubs 4 and 5 formed integral with the arms 2, 3, and the alined internally-threaded hubs 4' 5' formed integral with the arms 2' 3' in combination with the threaded studs 6, 15, adjustably secured in said hubs 4 and 5, and the box-bearings 9 and 13, secured between the inner ends of said studs, the studs 6' 15' adjustably secured in the hubs 4' 5', and the box-bearings 9' 13 secured between the inner ends of said studs 6' and 15', substantially as and for the purpose set forth.

In testimony whereof we hereunto affix our signatures in presence of two witnesses.

FREEMAN BEBOUT.
    JAMES H. BRANDON.

Witnesses:
 JAMES C. DEIDRICK,
 M. J. MCGARRY.